Oct. 17, 1961  F. M. MAYES  3,004,432
TANK GAUGE

Filed July 11, 1955  2 Sheets-Sheet 1

INVENTOR.
FRED M. MAYES
BY
ATTORNEYS

INVENTOR.
FRED M. MAYES

United States Patent Office 3,004,432
Patented Oct. 17, 1961

3,004,432
TANK GAUGE
Fred M. Mayes, Newtown Square, Pa., assignor to Sun Oil Company, Philadelphia, Pa., a corporation of New Jersey
Filed July 11, 1955, Ser. No. 521,099
4 Claims. (Cl. 73—313)

This invention relates to tank gauges and, particularly, to means for improving the accuracy of said gauges.

Tank gauges as presently provided suffer from inaccuracy particularly because of an unwarranted assumption made in their design that floats bear constant relationships to liquid levels. The position of a float may be accurately determined, but the relation of the float to the liquid surface is subject to various disturbances. First, there is the matter of deposits on a float changing its effective weight and accordingly changing its position relative to the liquid surface. Secondly, changes in specific gravity of the liquid undergoing measurement will also obviously affect the position of the float with respect to the liquid level. Third, friction in the float supporting means or guides for a float will serve to impose forces on the float which, when the liquid level changes, will cause indefiniteness of the position of the float with respect to the liquid surface.

It is the general object of the present invention to provide an arrangement in which the position of the float relative to the liquid surface is indicated so as to provide either indicated correction or an automatic correction of the apparent liquid level reading. As will become evident, the invention is applicable to many types of gauges, for example, of either remote or local reading types, and in its simplest form may provide merely a correction to be applied by the operator to secure the correct reading. However, to illustrate the general possibilities of application of the invention in practice, there will primarily be described herein a system providing for remote reading and in which the correction for float position relative to the liquid surface is made automatically.

Figure 1:
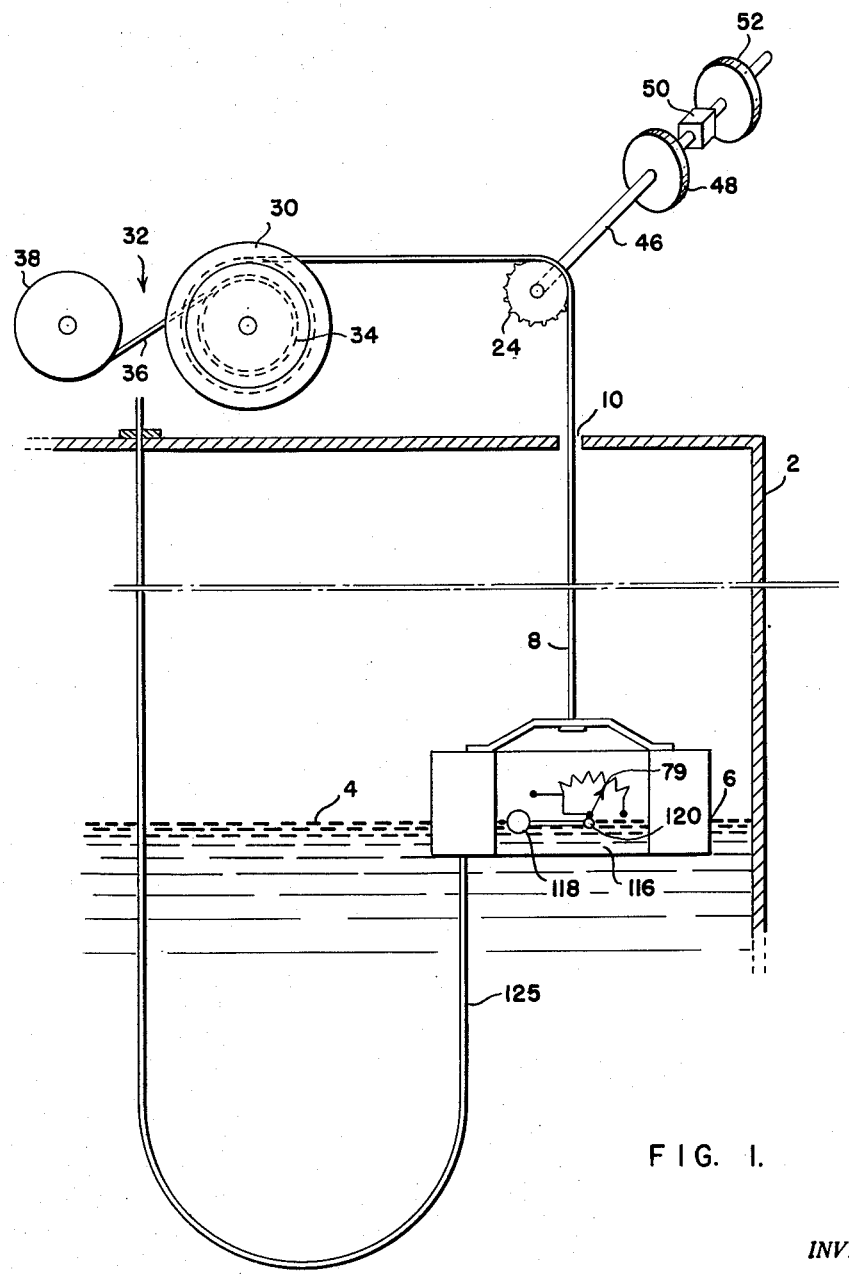
Figure 2:
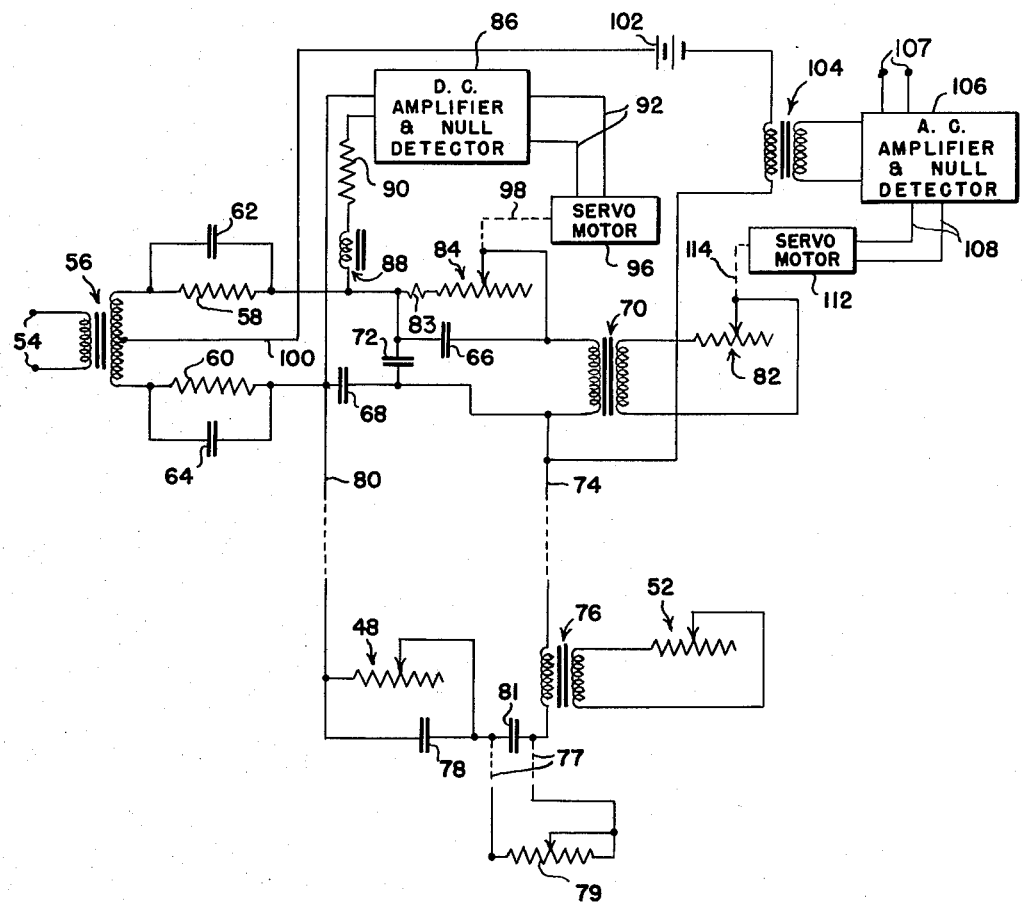

Other objects of the invention particularly relating to details of construction and operation will become apparent from the following description read in conjunction with the accompanying drawing in which:

FIGURE 1 is a diagrammatic and sectional view showing the improved gauging means associated with a tank; and FIGURE 2 is a wiring diagram showing the electrical connections involved.

Referring first to FIGURE 1, there is indicated at 2 the upper portion of a tank containing the liquid 4 which is to be gauged. A float 6 is suspended in the liquid buoyed thereby and subject to constant tension, while the float is stationary, of a tape 8 which extends through an opening 10 in the top of the tank and is trained about a sprocket wheel 24 which is provided with teeth engaging evenly spaced openings in the tape 8 so that rotation of the sprocket 24 is linearly related to movement of the tape. The tape then passes to a reel 30 on which the tape is wound. A constant spring arrangement 32 tends to impart substantially constant tension to the tape, this arrangement comprising a reel 34 secured to the reel 30, a flat spring 36 and a reel 38 which freely rotates in bearings. Such constant tension spring arrangements are well known. Complete constancy of this tension is not material since all that is required is the maintenance of the tape 8 in normally stretched condition. As will hereafter appear changes in tension on the tape are automatically corrected in accordance with the invention.

The sprocket 24 drives through a shaft 46 a potentiometer 48 of rotary type and through reduction gearing indicated at 50 a second potentiometer 52, also of rotary type. The arrangement is such that the potentiometer 48 passes through a complete rotation and a complete range of electrical variation through movement, for example, of one foot of the tape 8. The potentiometer 52, on the other hand, may move only a fraction of a complete rotation for one foot movement of the tape, the potentiometers thus serving for fine and coarse measurements of the float position.

The invention is particularly described herein as incorporated in an automatic remote indicating system which is particularly described in detail in my application Serial No. 521,098, filed July 11, 1955, now Patent 2,971,-378. In brief, in such system, remote readings are made of potentiometers such as 48 and 52, utilizing a bridge arrangement which actually incorporates a pair of bridges, one excited by direct current and the other by alternating current for the separate and independent indication of the positions of potentiometers 48 and 52. In particular, such system has the advantage of requiring only a single pair of conductors running from the tank to the remote reading location or station. In particular this is advantageous when a single reading installation is to be used for the reading of levels in a large number of tanks as in a tank farm, provision being then made for switching the reading unit to the conductors for the various tanks.

Reference may now be made particularly to FIGURE 2 which shows the bridge arrangements just referred to and also shows the application of the present invention to such arrangement.

Excitation is provided at terminals 54 which may be connected to the 60 cycle power supply or to any other desirable source of alternating current. These terminals are connected to the primary of a transformer 56 the ends of the secondary of which are connected to the respective parallel arrangements of resistors 58 and 60 and capacitors 62 and 64. The other ends of these arrangements are connected through capacitors 66 and 68 to the primary winding of a transformer 70, there being shunted across the arrangement at 72 a capacitor to obtain approximate balance of the capacity of the remote connecting line. The lower terminal of the primary of transformer 70, as shown, is connected through one conductor 74 of a cable to the primary of a transformer 76, across the secondary of which there is connected the potentiometer 52 previously referred to which is actually connected as a variable resistance. (Potentiometers have been referred to because the accurate elements desirably involved at 48 and 52 are sold commercially as potentiometers, though, as used in the present circuit, they are connected as variable resistors.) The lower end of the primary of transformer 76 is connected through a capacitor 81 and the parallel arrangement of capacitor 78 and potentiometer 48 to the cable conductor 80 which runs to the junction between resistor 60 and capacitor 68. Shunted across the capacitor 81 are a pair of leads of a flexible cable 77 which are connected to an automatically variable resistor 79 as will be described in greater detail hereafter. The conductors 74 and 80 are those of a two-conductor cable which runs between the tank and the receiving or reading or recording station. This may be quite remote from the tank. The elements which are local to the tank are those connected to the lower ends of the conductors 74 and 80, while the elements at the receiving station are those connected to the upper ends of these conductors.

The secondary of transformer 70 has shunted across it a potentiometer 82 desirably of precision type which is connected as a variable resistance. For reading, the contact of this potentiometer is connected to a pointer, not shown, associated with a scale.

Connected across the capacitor 66 are a resistor 83 and a potentiometer 84 similar to potentiometer 82, and also connected as a variable resistance and furnished with a pointer and a scale for direct reading. The resistor 83 is provided to correspond with the normal value of the resistance at 79 when the relationship between the liquid level and float has some nominal "normal" value.

A direct current amplifier and null detector 86 is connected between the ends of resistors 58 and 60 which are remote from the secondary winding of the transformer 56, the connections including a choke 88 and a suitable resistor 90, the choke being provided to minimize the flow of alternating signal to the amplifier 86. The output of the amplifier 86 is delivered to a servo motor 96 through connections indicated at 92. The servo motor 96 serves to drive through mechanical connection 98 the contact of the potentiometer 84.

To the center tap of the secondary of transformer 56 there is connected the line 100 which includes a battery 102 and the primary winding of a transformer 104, connection being to the receiver end of the conductor 74. The secondary of transformer 104 feeds an alternating current amplifier and null detector 106 the output of which drives the servo motor 112 through connections 108. The amplifier 106 is desirably phase sensitive and is fed through connections 107 from the same source of alternating current which supplies terminals 54. The servo motor 112 serves to drive through mechanical connections 114 the contact of the potentiometer 82.

The two amplifiers and null detectors 86 and 106 are of conventional types providing outputs depending upon the sign or phase of the inputs to drive reversely the respective servo motors 96 and 112.

An inspection of the circuit shown in FIGURE 2 will reveal that it incorporates a pair of balanceable bridges, one acting under direct current excitation and the other under alternating excitation. The operation of these bridges is not of particular significance in accordance with the present invention, and reference may be made to my application referred to above for details of operation. Briefly stated, the operation is as follows:

From the standpoint of direct current operation the resistors 58 and 60 constitute two adjacent arms of the bridge, a third arm is provided by the variable resistance at 84, and the fourth arm is provided by the series arrangement of the variable resistances at 48 and 79. Excitation is from the battery 102, and the unbalanced signal is delivered to the amplifier and null detector 86. Involved in the bridge are the resistances of the secondary winding of transformer 56 and the primary windings of transformers 70 and 76. However these may be considered to be of low and negligible resistance and in any event are in a balanced arrangement, it being assumed that the transformers 70 and 76 are the same and that the secondary of transformer 56 is center tapped. If resistances 58 and 60 are equal, automatic balance is achieved by servo motor 96 when the resistance appearing at 84 is equal to the sum of the resistances appearing at 48 and 79.

From the standpoint of alternating current operation, the various resistances just mentioned are shorted by capacitors of low reactance and the alternating current bridge comprises as its effective arms the two equal halves of the secondary winding of transformer 56 and the primary windings of transformers 70 and 76 which have reactances dependent upon the resistances at 82 and 52. Alternating excitation is through the transformer 56, and the unbalanced signal is delivered through transformer 104 to the alternating current amplifier and null detector 106. Balance of the alternating current bridge is achieved automatically by the operation of servo motor 112 when the resistance at 82 is equal to the resistance at 52.

If the resistance 79 were zero, the pointers connected with potentiometers 82 and 84 would indicate the float position and the liquid level, if the latter were assumed to have a definite fixed position with respect to the float. This results from the fact that the resistances at 52 and 48 are varied respectively in direct linear relationship to the position of the float expressed in feet and fractions of a foot. As will shortly appear, the resistance 79 is varied in accordance with the position of the float relative to the liquid surface, and accordingly with the resistance 79 scaled to correspond to resistance 48 for movements of their contacts, the resistor 79 provides a correction which is taken into account in the balancing of the resistance at 84 to give a direct and true indication of the liquid level. It will be noted that this correction is introduced only into the direct current bridge which is involved in the fractional foot measurements. The error which would appear in the footage indication of the variation of the resistance at 82 is negligible since this resistance in any event is merely indicative of the particular foot in which accurate measurement is being made.

It will, of course, be evident that the measurements made by the bridges could be reversed, the alternating bridge arrangement measuring fractions of a foot and the direct current bridge arrangement measuring feet. However, direct current bridge measurements are usually more accurate with simplicity of apparatus and it is therefore preferred to have the fractional foot indications made by the direct current bridge.

The float 6 is of a type having an annular buoyancy chamber with a central space 116 in which there is pivoted a float 118, the pivotal mounting being at 120. The float carries a contact arm cooperating with a resistor and constituting the variable resistor arrangement 79 of FIGURE 2. The conductors 77 running from this are contained within a light and flexible cable 125 which may extend from the bottom of the float through the tank. The float 118 may be quite small and subject to very little error in indicating the relationship of the liquid surface to the float. The value of resistance 79, therefore, gives the relative position of the float with respect to the liquid surface to a high degree of accuracy. With this relation thus accurately given it is obviously immaterial that the float may actually have a relatively indefinite position with respect to the liquid surface. Indefiniteness of position due to friction, accumulation of matters on the float, changes in the specific gravity of the liquid, variations in tension on the supporting cable 8, variations in load such as may be imposed by the cable 125, etc., are automatically compensated by the action of the float 118 in varying resistance 79.

While resistance 79 has been disclosed as involved in providing a correction in an automatic apparatus involving a balanceable bridge arrangement, it will be obvious that the invention is applicable to simpler tank gauges, for example, of the purely mechanical type in which a tape or cable supporting a float merely directly drives a dial indicator. In such case, the value of resistance 79 might be read electrically on an ohmmeter connected to it by a flexible cable such as 125, the ohmmeter being calibrated in terms of the position of the float with respect to the liquid level, the reading being then applied as a correction to that appearing on the dial indicator. Furthermore, detecting means other than a float-operated resistance may be used to indicate the float-liquid surface relationship; for example, this relationship may be indicated by a capacitance measurement, by a manometer measurement, by a high frequency wave line measurement or the like. What is broadly involved in the present invention is the making of a measurement of the position of a float or other device generally following a liquid surface with respect to that surface to provide a correction for the attainment of high accuracy in determining the actual position of the liquid surface.

What is claimed is:

1. Apparatus for gauging liquid level comprising a member movable to follow changes of the liquid level, means movable in response to movements of said member providing an electrical signal indicating the level of said member, a second means mounted on said member and providing an electrical signal indicating the position of said member relative to the liquid level and means for adding said signals.

2. Apparatus for gauging liquid level comprising a member movable to follow changes of the liquid level, means movable in response to movements of said member providing a variable impedance indicating the level of said member, means mounted on said member and providing a second variable impedance in series with the first variable impedance and indicating the position of said member relative to the liquid level, and means measuring the series arrangement of said impedances.

3. Apparatus for gauging liquid level comprising a member movable to follow changes of the liquid level, means movable in response to movements of said member providing a variable impedance indicating the level of said member, means mounted on said member and providing a second variable impedance in series with the first variable impedance and indicating the position of said member relative to the liquid level, and means providing a measuring bridge including said series arrangement of the variable impedances.

4. Apparatus for gauging liquid level comprising a member movable to follow changes of the liquid level, means movable in response to movements of said member providing a variable impedance indicating the level of said member, means mounted on said member and providing a second variable impedance in series with the first variable impedance and indicating the position of said member relative to the liquid level, and means providing an automatically balanceable bridge including said series arrangement of the variable impedances.

References Cited in the file of this patent

UNITED STATES PATENTS

| | | |
|---|---|---|
| 1,787,132 | Orsdale | Dec. 30, 1930 |
| 1,788,465 | Lamar | Jan. 13, 1931 |
| 2,110,490 | Renner | Mar. 8, 1938 |
| 2,117,185 | Lynskey | May 10, 1938 |
| 2,416,808 | Weiss | Mar. 4, 1947 |
| 2,486,823 | Cranmer | Nov. 1, 1949 |
| 2,724,273 | Sontheimer | Nov. 22, 1955 |
| 2,728,035 | Meredith | Dec. 20, 1955 |